US012741484B2

(12) United States Patent
Hwang

(10) Patent No.: US 12,741,484 B2
(45) Date of Patent: Sep. 22, 2026

(54) OMNIDIRECTIONAL ROTATION DRIVE DEVICE

(71) Applicants: HYUNDAI MOTOR COMPANY, Seoul (KR); KIA CORPORATION, Seoul (KR)

(72) Inventor: Sang Woo Hwang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 375 days.

(21) Appl. No.: 18/534,393

(22) Filed: Dec. 8, 2023

(65) Prior Publication Data

US 2025/0074109 A1 Mar. 6, 2025

(30) Foreign Application Priority Data

Sep. 4, 2023 (KR) ........................ 10-2023-0116758

(51) Int. Cl.
*B60B 19/12* (2006.01)
*B60B 19/00* (2006.01)
*F16H 1/16* (2006.01)

(52) U.S. Cl.
CPC .......... *B60B 19/125* (2013.01); *B60B 19/003* (2013.01); *F16H 1/16* (2013.01)

(58) Field of Classification Search
CPC ..... B60B 19/003; B60B 19/12; B60B 19/125; B60K 1/00; B60K 7/0007; B60K 17/04; B60K 2007/0092; F16H 1/14
See application file for complete search history.

(56) References Cited

U.S. PATENT DOCUMENTS

| | | | |
|---|---|---|---|
| 7,056,185 | B1 | 6/2006 | Anagnostou |
| 7,528,518 | B2 | 5/2009 | Maeda et al. |
| 8,342,270 | B2 | 1/2013 | Takenaka et al. |
| 8,424,621 | B2 | 4/2013 | Uehara |
| 2006/0158050 | A1 | 7/2006 | Maeda et al. |
| 2012/0086262 | A1 | 4/2012 | Makino |
| 2019/0184737 | A1 | 6/2019 | Tadakuma et al. |

FOREIGN PATENT DOCUMENTS

| | | | | | |
|---|---|---|---|---|---|
| CN | 210116378 | U | | 2/2020 | |
| CN | 106741403 | B | | 4/2022 | |
| JP | 5158698 | B2 | * | 3/2013 | |
| JP | 2019093817 | A | | 6/2019 | |
| JP | 6617301 | B2 | * | 12/2019 | ............. B60B 19/00 |
| KR | 20060084352 | A | | 7/2006 | |
| WO | WO-2015156263 | A1 | * | 10/2015 | ........... B60B 19/003 |
| WO | WO-2018056416 | A1 | * | 3/2018 | ............. B60B 19/00 |

* cited by examiner

*Primary Examiner* — Kip T Kotter
*Assistant Examiner* — Taekwon Choi
(74) *Attorney, Agent, or Firm* — Lempia Summerfield Katz LLC

(57) ABSTRACT

An omnidirectional rotation drive device includes a knuckle connected to a vehicle body, a wheel body configured to rotate around the knuckle, a plurality of sub-wheel units rotatably supported on the wheel body, and a bevel gear located in the wheel body and configured to rotate around the knuckle. The plurality of sub-wheel units is rotated depending on a difference between an angular speed of the wheel body and an angular speed of the bevel gear.

17 Claims, 4 Drawing Sheets

OMNIDIRECTIONAL ROTATION DRIVE DEVICE

CROSS-REFERENCE TO RELATED APPLICATION

This application claims, under 35 U.S.C. § 119(a), the benefit of priority to Korean Patent Application No. 10-2023-0116758, filed on Sep. 4, 2023, the entire contents of which are incorporated herein by reference.

BACKGROUND

(a) Technical Field

The present disclosure relates to an omnidirectional rotation drive device. More particularly, the present disclosure relates to an omnidirectional rotation drive device including a plurality of sub-wheel units formed in two rows on the outer surface of a wheel body configured to rotate in a first direction and in a second direction.

(b) Background Art

Recently, in the electric vehicle (EV) industry, development has been conducted on an omnidirectional wheel structure capable of driving on a flat surface without changing the steering angle. An omni wheel is also referred to as an omnidirectional movement wheel. In other words, an omni wheel means a wheel capable of moving in all directions. The structure of an omni wheel enables various types of movement that may not be implemented by an ordinary wheel. For example, an omni wheel may enable a transportation device to rotate in place, move horizontally to the left, and move horizontally to the right.

However, the conventionally developed omni-wheel structure has a problem in that, due to a discontinuous structure of a sub-wheel unit and low power transmission efficiency, such an omni wheel may not be capable of being applied to a vehicle using existing suspension structures.

The above information disclosed in this Background section is only to enhance understanding of the background of the disclosure. Therefore, the Background section may contain information that does not form the prior art that is already known to a person of ordinary skill in the art.

SUMMARY OF THE DISCLOSURE

The present disclosure has been made in an effort to solve the above-described problems associated with the prior art. An object of the present disclosure is to provide an omnidirectional rotation drive device configured to enable a vehicle to move in a first direction through a wheel body and to enable the vehicle to move in a second direction by selectively driving a sub-wheel unit.

Further, the present disclosure provides an omnidirectional rotation drive device configured to selectively drive a sub-wheel unit by providing a bevel gear located in a wheel body connected to a first motor and coupled to a second motor.

The objects of the present disclosure are not limited to the above-mentioned objects. Other technical objects not mentioned herein should be more clearly understood by reading the following description and should be more clearly understood by considering embodiments of the present disclosure. Additionally, the objects of the present disclosure may be realized by embodiments that fall within the scope of the claims and a combination thereof.

In one aspect, the present disclosure provides an omnidirectional rotation drive device including a knuckle connected to a vehicle body, a wheel body configured to rotate around the knuckle, a plurality of sub-wheel units rotatably supported on the wheel body, and a bevel gear located in the wheel body. The bevel gear is configured to rotate around the knuckle, in which the plurality of sub-wheel units are rotated depending on a difference between an angular speed of the wheel body and an angular speed of the bevel gear.

In an embodiment, a central axis of rotation of the plurality of sub-wheel units may be perpendicular to a central axis of rotation of the wheel body.

In another embodiment, the omnidirectional rotation drive device may further include a first motor configured to rotatably drive the wheel body and a second motor configured to rotatably drive the bevel gear.

In still another embodiment, the omnidirectional rotation drive device may further include a plurality of drive shafts rotatably supported on the wheel body and configured to connect the bevel gear to the plurality of sub-wheel units.

In yet another embodiment, each of the plurality of drive shafts may have one end formed of a drive bevel gear meshed with the bevel gear. Each of the plurality of drive shafts may have another end formed of a drive worm gear meshed with a sub-wheel worm gear of each of the plurality of sub-wheel units.

In still yet another embodiment, each of the plurality of drive shafts may have one end meshed with a corresponding one of opposite side surfaces of the bevel gear. Each of the plurality of drive shafts may have another end meshed with a corresponding one of the plurality of sub-wheel units formed in two rows on the opposite side surfaces of the bevel gear.

In a further embodiment, the wheel body may rotate in a first direction and the plurality of sub-wheel units may rotate in a second direction. A first directional speed may be calculated by a mathematical formula of $Vx=R\times W1$. A second directional speed may be calculated by a mathematical formula of $Vy=n1\times n2\times r\times W1-n1\times n2\times r\times W2$. In these equations, W1 is an angular speed of the wheel body, R is a radius from a central axis of the wheel body to the sub-wheel unit, W2 is an angular speed of the bevel gear, n1 is a gear ratio of the bevel gear to the drive bevel gear, and n2 is a gear ratio of the sub-wheel worm gear to the drive worm gear.

In another further embodiment, the wheel body may include a central portion surrounding the knuckle and a bridge part formed to extend outward from the central portion. The bridge part may have the sub-wheel units formed in two rows and located therein.

In still another further embodiment, only the wheel body may be rotatably driven when the first motor and the second motor rotate at the same angular speed. The wheel body and the plurality of sub-wheel units may be simultaneously rotatably driven when the first motor rotates and the second motor stops. Only the plurality of sub-wheel units may be rotatably driven when the first motor stops and the second motor rotates.

In another aspect, the present disclosure provides an omnidirectional rotation drive device including a knuckle connected to a vehicle body and a wheel body configured to rotate around the knuckle. The drive device also includes a plurality of sub-wheel units rotatably supported on the wheel body, a bevel gear located in the wheel body and configured to rotate around the knuckle, and a plurality of drive shafts.

The drive shafts are rotatably supported on the wheel body and configured to connect the bevel gear to the plurality of sub-wheel units. The plurality of drive shafts are configured not to be parallel to the bevel gear.

In an embodiment, a central axis of rotation of the plurality of sub-wheel units may be perpendicular to a central axis of rotation of the wheel body.

In another embodiment, the omnidirectional rotation drive device may further include a first motor configured to rotatably drive the wheel body and a second motor configured to rotatably drive the bevel gear.

In still another embodiment, each of the plurality of drive shafts may have one end formed of a drive bevel gear meshed with the bevel gear. Each of the plurality of drive shafts may have another end formed of a drive worm gear meshed with a sub-wheel worm gear of each of the plurality of sub-wheel units.

In yet another embodiment, each of the plurality of drive shafts may have one end meshed with a corresponding one of opposite side surfaces of the bevel gear. Each of the plurality of drive shafts may have another end meshed with a corresponding one of the plurality of sub-wheel units formed in two rows on the opposite side surfaces of the bevel gear.

In still yet another embodiment, the wheel body may rotate in a first direction and the plurality of sub-wheel units may rotate in a second direction. A first directional speed may be calculated by a mathematical formula of $Vx=R\times W1$. A second directional speed may be calculated by a mathematical formula of $Vy=n1\times n2\times r\times W1-n1\times n2\times r\times W2$. In the equations, W1 is an angular speed of the wheel body, R is a radius from a central axis of the wheel body to the sub-wheel unit, W2 is an angular speed of the bevel gear, n1 is a gear ratio of the bevel gear to the drive bevel gear, and n2 is a gear ratio of the sub-wheel worm gear to the drive worm gear.

In a further embodiment, the wheel body may include a central portion surrounding the knuckle and a bridge part formed to extend outward from the central portion. The bridge part may have the sub-wheel units formed in two rows and located therein.

In another further embodiment, the plurality of sub-wheel units may be rotated depending on a difference between an angular speed of the wheel body and an angular speed of the bevel gear.

Other aspects and embodiments of the present disclosure are discussed below.

It should be understood that the terms "vehicle", "vehicular", and other similar terms as used herein are inclusive of motor vehicles in general. Such motor vehicles may encompass passenger automobiles including sport utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the present disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein.

Figure 1:
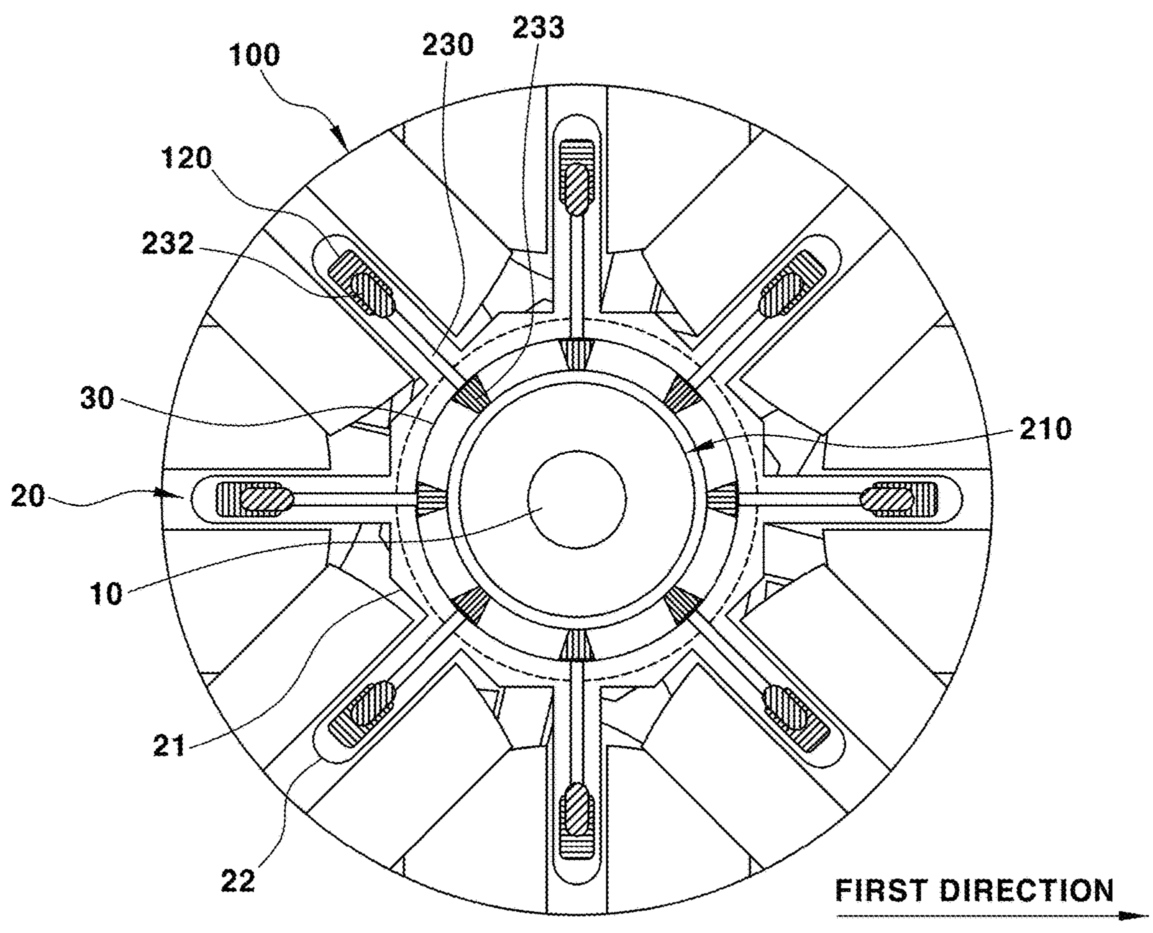
FIG. 1 is a front cross-sectional view of an omnidirectional rotation drive device according to an embodiment of the present disclosure.

It should be understood that the appended drawings are not necessarily drawn to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawings.

DETAILED DESCRIPTION

Hereinafter, reference is made in detail to various embodiments of the present disclosure, examples of which are illustrated in the accompanying drawings and described below. While the technical concepts of the present disclosure are described in conjunction with various embodiments, it should be understood that the present description is not intended to limit the disclosure to the embodiments described herein. On the contrary, the present disclosure is intended to cover not only the disclosed embodiments, but also various alternatives, modifications, equivalents, and other embodiments, which may be included within the spirit and scope of the disclosure as defined by the appended claims. The present embodiments are provided to more fully explain the disclosure to those of ordinary knowledge in the art.

Terms such as "part", "unit", and "module" described in the specification mean a unit configured to process at least one function or operation, and the unit may be implemented by hardware or software or a combination of hardware and software. When a component, device, element, or the like of the present disclosure is described as having a purpose or performing an operation, function, or the like, the component, device, or element should be considered herein as being "configured to" meet that purpose or perform that operation or function. Further, the device may include or be controlled by one or more controllers having one or more processors and one or more memories, such as non-transitory memories, to store and execute instructions as described herein.

The terms used in the present application are used only to describe specific embodiments and are not intended to limit the present disclosure. Singular forms are intended to include plural forms as well, unless the context clearly indicates otherwise.

Meanwhile, in this specification, terms such as "first" and "second" are used to describe various components having the same names, and the terms are used only for the purpose of distinguishing one component from other components. The components are not limited by the terms in the following description.

In this specification, a first direction refers to a forward-and-rearward direction of a vehicle. Further, a width direction of the vehicle, which is perpendicular to the first direction, is hereinafter referred to as a second direction. In addition, when one direction of the first direction and the second direction is referred to as a positive direction, a negative direction may be interpreted as referring to a direction opposite or reverse of the positive direction.

Hereinafter, embodiments are described in detail with reference to the accompanying drawings. In describing the embodiments with reference to the accompanying drawings, the same or corresponding components are denoted by the same reference numerals and redundant description thereof have been omitted.

The present disclosure relates generally to an omnidirectional rotation drive device. More particularly, the present disclosure relates to an omni-structure drive device capable of moving in all directions by providing a wheel body 20 that can rotate in the first direction and a sub-wheel unit 100 that can rotate in the second direction.

Figure 2:
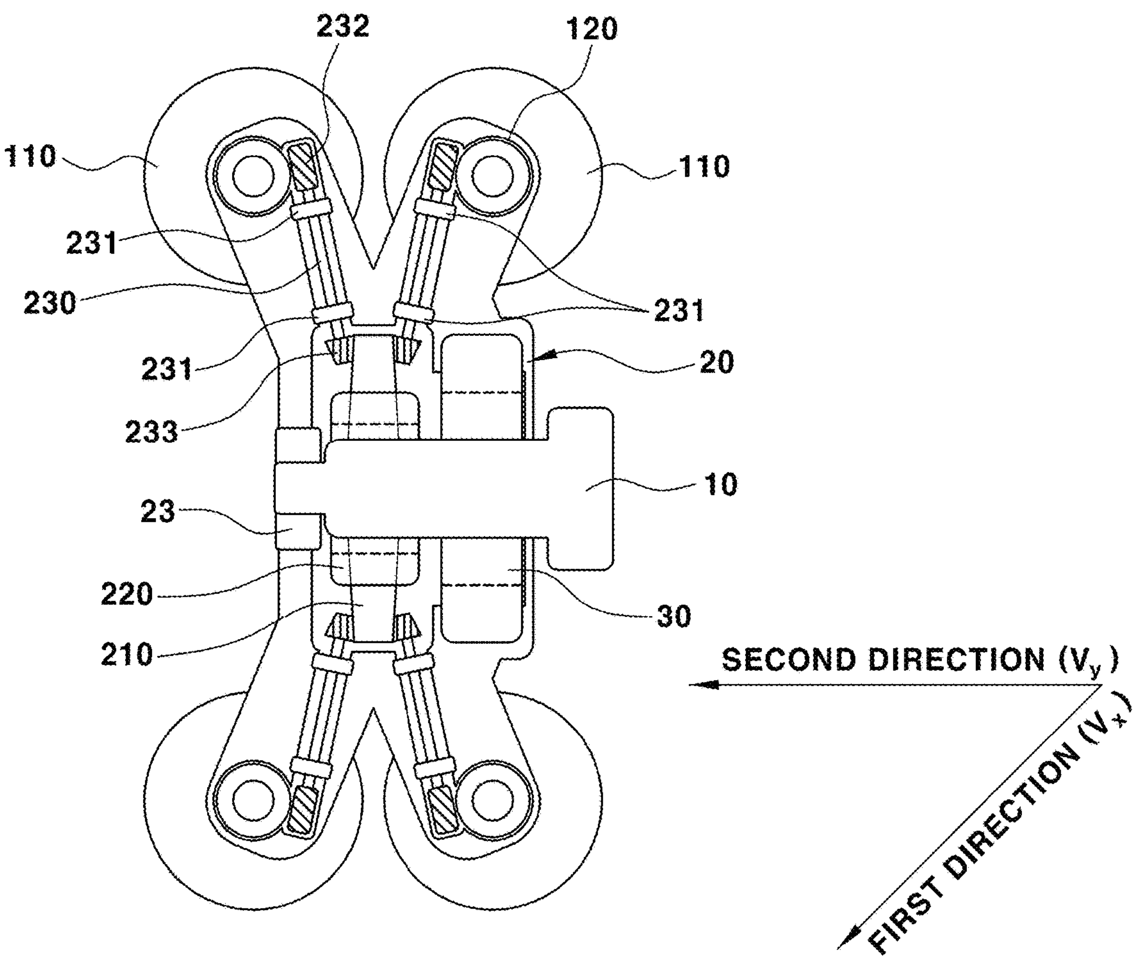
FIG. 2 is a side cross-sectional view of the omnidirectional rotation drive device according to an embodiment of the present disclosure.

As shown in FIGS. 1 and 2, the omnidirectional rotation drive device of the present disclosure includes a knuckle 10. At least a part of the knuckle 10 is disposed in a vehicle. The drive device also includes a first motor 30 located on the knuckle 10 with the knuckle 10 as the central axis and configured to rotate the wheel body 20. In one example, the wheel body 20 is located around the outer peripheral surface of the knuckle 10 and is formed to extend outward from the outer peripheral surface thereof. The first motor 30 has a stator located in the knuckle 10 and a rotor integrally rotated with the wheel body 20.

In addition, when the stator of the first motor 30 is fixed to the knuckle 10 and current is applied to rotate the rotor, the rotor and the wheel body 20 are configured to be integrally rotated. Further, the wheel body 20 is configured to be rotated in the first direction, and drive force of the vehicle in the forward-and-rearward direction is configured to be applied through the first motor 30. As an embodiment of the present disclosure, the wheel body 20 and the rotor of the first motor 30 are interpreted as the same concept.

The wheel body 20 is configured to be rotated in the first direction with respect to a central portion 21 having the knuckle 10 located therethrough. The wheel body 20 is also formed to extend outward from the central portion 21 in the radial direction of the knuckle 10 and is configured to allow the sub-wheel unit 100 to be coupled thereto. In the embodiment of the present disclosure, the bridge parts 22 are formed to extend in two rows along the outside, i.e., the radial outer side, of the central portion 21 in the side cross section, and sub-wheels 110 are respectively coupled to the outer sides or ends of the bridge parts 22. In one embodiment, two adjacent sub-wheels 110 may be located in each row of the sub-wheel units 100 arranged in two rows so as to have the same central axis. Additionally, the central axis of rotation of each of the sub-wheels 110 formed in two row is formed in a direction perpendicular to the central axis of rotation of the wheel body 20.

The knuckle 10 penetrates one side of the wheel body 20, and one end thereof is coupled to a wheel drive shaft bearing 23 located on the other side of the wheel body 20. Here, the wheel drive shaft bearing 23 is configured to fix one end of the knuckle 10 in response to rotation of the wheel body 20.

The bridge parts 22 of the wheel body 20 each include at least two rows of the sub-wheel units 100 disposed on the outer peripheral surface thereof and located in the second direction. The sub-wheel units 100 are located at the outer end or circumference of the wheel body 20. Here, two rows of the sub-wheel units 100 are located at the end of the wheel body 20 in the second direction. Further, the sub-wheel units 100 are respectively located inside, i.e., at the inner side, and outside, at the outer side, of the wheel body 20 and are configured to have overlapping intervals on each side of the wheel body 20. Additionally, each sub-wheel unit 100 located in each row includes two sub-wheels 110 adjacent to each other. Here, two sub-wheels 110 forming one sub-wheel unit 100 are constrained to the same axis by one drive unit and are simultaneously rotated. The sub wheel units 100, including the sub-wheels 110 define the outer contact surface of the wheel body 20.

In other words, the sub-wheel unit 100 has two sub-wheels 110 having the same central axis. Here, two sub-wheels 110 are arranged in two rows on the bridge part 22. Two adjacent sub-wheels 110 rotated by one drive shaft 230 form a first row inside the wheel body 20. Further, two adjacent sub-wheels 110 rotated by another adjacent drive shaft 230 form a second row outside the wheel body 20. In other words, each drive shaft 230 is located to be meshed between a bevel gear 210 and the paired sub-wheels 110 so that the number thereof is equal to the number of two adjacent sub-wheels 110.

FIG. 1 is a front cross-sectional view of the rotation drive device. In FIG. 1, two sub-wheels 110 are coupled to the opposite ends of one drive shaft 230. In other words, FIG. 1 shows one row forming a sub-wheel unit 100, and two sub-wheels 110, the central axes of which are constrained to one drive shaft 230, are located in the sub-wheel unit 100.

In addition, FIG. 2 is a side cross-sectional view of the rotation drive device. FIG. 2 shows a configuration of the sub-wheel units 100 formed in two rows at the outer end of the wheel body 20. The drive unit is configured to rotate the sub-wheel units 100. Here, the drive unit includes a second motor 220 having a stator coupled to the knuckle 10, the bevel gear 210 configured to correspond to the stator, and the drive shafts 230 configured to connect the bevel gear 210 to the sub-wheel units 100.

Further, each drive shaft 230 is configured to be coupled to the outer surface of the bevel gear 210. In other words, the sub-wheel units 100 formed in two rows are configured to be respectively coupled to two drive shafts 230 coupled to the outer surface of the bevel gear 210 at a predetermined angle.

Therefore, each of the sub-wheel units 100 of the present disclosure has a configuration in which the central axes of a pair of adjacent sub-wheels 110 are coupled to the end of one drive shaft 230. The sub-wheel units 100 are formed in two rows in the second direction.

The drive unit coupled to the sub-wheel units 100 is configured to transmit drive force from the second motor 220 located in the knuckle 10 to the sub-wheel units 100. In one embodiment, the second motor 220 is fixed to the wheel body 20 and includes the bevel gear 210 to which rotational force of the second motor 220 is applied. A drive shaft 230 that contacts the outer surface of the bevel gear 210 and transmits rotational force of the bevel gear 210 is provided between the bevel gear 210 and a sub-wheel unit 100. The drive shafts 230 are configured to apply rotational force to each of the plurality of sub-wheel units 100.

The bevel gear 210 is formed in a circular shape to surround the knuckle 10. When viewed from the side, the bevel gear 210 is configured to have a tapered shape so as to have a predetermined bevel angle. Here, the predetermined angle is formed as the bevel gear 210 moves away from the knuckle 10 from a position at which the bevel gear 210 is in contact with the knuckle 10. In one embodiment, opposite side surfaces near the end or circumferential edge of the bevel gear 210, i.e., the opposite side surfaces respectively facing one end of the drive shafts 230, may be formed to have a narrower cross-sectional width than that of the area of the bevel gear 210 in contact with the knuckle 10.

The sub-wheel unit 100, which receives drive force from the second motor 220, is configured to calculate a second directional movement speed according to an angular speed W1 of the wheel body 20 and an angular speed W2 of the bevel gear 210 rotated by the second motor 220. In other words, the second motor 220 includes a stator coupled to the knuckle 10, and the bevel gear 210 is provided as a rotor. Therefore, the wheel body 20 is rotated according to the rotational angular speed of the first motor 30. Here, when the second motor 220 is rotated at the same rotational angular speed as that of the first motor 30, the sub-wheels 110 are switched to a non-rotating state. Accordingly, rotation of the wheel body 20 is applied to perform first directional movement of the vehicle.

Furthermore, the movement speed of the sub-wheel units 100 is set in response to drive force (angular speed) of the first motor 30 and the second motor 220.

In other words, the stator of the first motor 30 is disposed in the knuckle 10. The drive shafts 230 are rotated in response to a difference between the rotational angular speed of the wheel body 20 according to driving of the first motor 30 and the rotational angular speed of the bevel gear 210 according to driving of the second motor 220. Accordingly, the sub-wheel units 100 are rotated in the second direction in response to whether rotation of the drive shafts 230 are performed. Here, when the wheel body 20 is rotated in a state in which the first motor 30 and the second motor 220 are coupled to the knuckle 10, the second motor 220 needs to be driven at a speed higher or lower than the rotational angular speed of the wheel body 20 so as to generate a difference in the angular speed of the wheel body 20 and the bevel gear 210, thereby enabling the sub-wheel unit 100 to be rotated. In other words, the rotational speed of the sub-wheel units 100 is set according to the difference between the angular speed of the wheel body 20 and the angular speed of the bevel gear 210.

The drive shafts 230 have one end coupled to the side surface of the bevel gear 210 and the other end coupled to a sub-wheel worm gear 120 located on the central axes of the two sub-wheels 110. In one embodiment, each drive shaft 230 includes a drive worm gear 232 located at one end of the drive shaft 230 and coupled to the sub-wheel worm gear 120 located on the central axes of the plurality of sub-wheels 110. Each drive shaft 230 also includes a drive bevel gear 233 located at the other end of the drive shaft 230 and coupled to the bevel gear 210.

Furthermore, the drive shafts 230 are respectively disposed on the opposite sides of the bevel gear 210 in a state of being inclined at a predetermined angle with respect to the height direction in the first direction. In other words, each drive shaft 230 is configured not to be parallel to the first direction and is disposed not to be parallel to the rotation axis of the bevel gear.

Accordingly, the sub-wheel units 100 arranged in two rows may be formed by the drive shafts 230 that are coupled to one bevel gear 210. Also, the sub-wheel units 100 are arranged in two rows in the second direction to couple the drive shafts 230 such that the drive shafts are arranged to be inclined to the left side and the right side, i.e., the inner and outer side of the wheel body 20.

In this manner, each drive shaft 230 is fixed to a drive shaft bearing 231 located in the wheel body 20, and each drive shaft 230 is rotated in response to a difference in rotational angular speed between the bevel gear 210 and the wheel body 20. In other words, the drive shafts 230 are rotated according to the difference in rotational angular speed between the bevel gear 210 and the wheel body 20 and the drive shafts 230 are configured to apply rotational force to the sub-wheel units 100.

Figure 3:
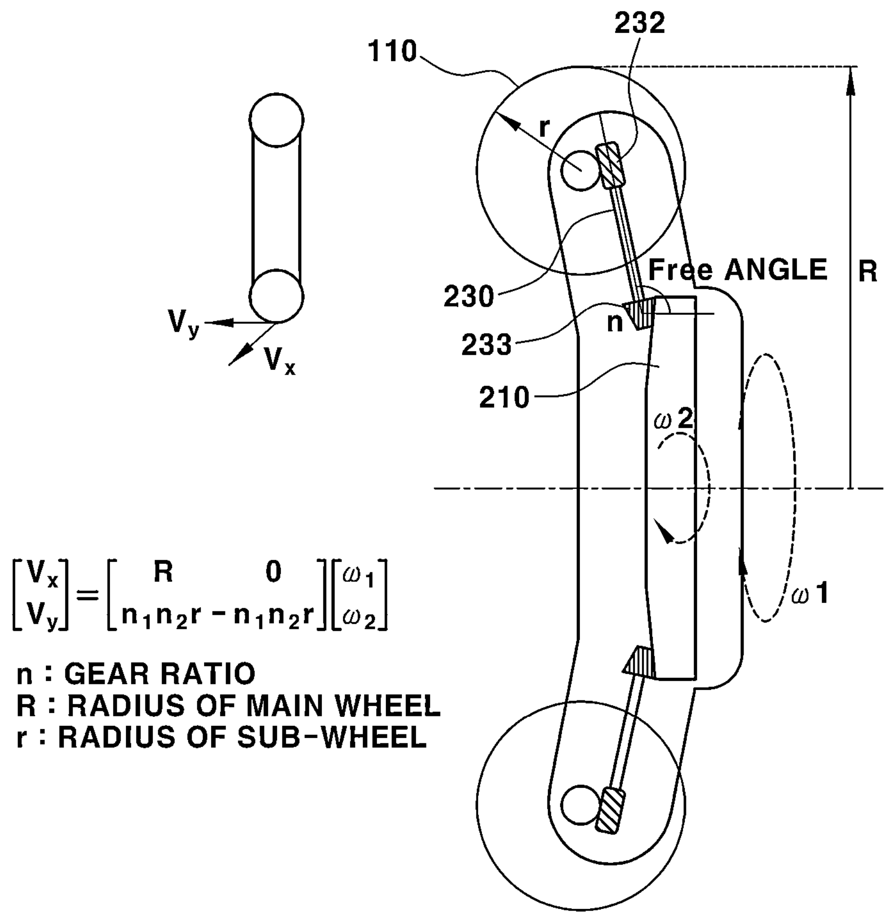
FIG. 3 is a diagram showing a coupling relationship between a bevel gear and a drive shaft of the omnidirectional rotation drive device according to an embodiment of the present disclosure.

According to one embodiment of the present disclosure, FIG. 3 shows a coupling relationship between the bevel gear 210 and the drive shafts 230. Further, in FIG. 3, the movement speed of the wheel body 20 and the sub-wheel unit 100 are depicted according to the difference in rotational angular speed between the bevel gear 210 and the wheel body 20.

The bevel gear 210 is driven as a rotor of the second motor 220 and is configured to be rotated in the first direction inside the wheel body 20. The drive shafts 230 are coupled to the outer surface of the bevel gear 210 so as to have a predetermined angle. In one embodiment, each drive shaft 230 is coupled to the side surface of the bevel gear 210 with respect to the height direction in the first direction and forms an angle so that one end thereof coupled to the sub-wheels 110 is spaced outside the central axis of the wheel body 20.

In other words, the position of the sub-wheels 110 coupled to one end of the drive shaft 230 is set depending on the angle formed by the drive bevel gears 233 respectively coupled to the bevel gear 210. In one embodiment, the angle between the drive shafts 230 respectively coupled to the opposite surfaces of the bevel gear 210 and configured to face each other is set so that the sub-wheels 110, each of which is located in a corresponding row of the bridge part 22 formed in two rows, are prevented from interfering with each other.

The drive shafts 230 are coupled to the bevel gear 210 located in the central portion 21 and are coupled to the sub-wheel units 100 located in the bridge part 22. In one embodiment, the drive shafts 230 each have one end including the drive worm gear 232 coupled to the sub-wheel unit 100 located in the bridge part 22, and the other end including the drive bevel gear 233 coupled to the bevel gear 210 located in the central portion 21.

In the drawings, the bottom of the wheel body 20 may be rotated in the incoming direction with respect to the plane of the drawing. The bevel gear 210 is then rotated in the same direction. When the bevel gear 210 is rotated at a relatively faster angular speed than the angular speed of the wheel body 20, the drive bevel gears 233 located on the drive shafts 230 located at the same height in the first direction are rotated in a direction away from each other. The sub-wheel units 100 are then rotated in the counterclockwise direction of the drawing.

Conversely, the top of the wheel body 20 may be rotated in the incoming direction with respect to the plane of the drawing. When the angular speed of the bevel gear 210 is faster than the angular speed of the wheel body 20, the drive shafts 230 located to correspond to the opposite sides of the bevel gear 210 are rotated in a direction approaching each other. The sub-wheel units 100 are then rotationally driven in the clockwise direction of the drawing.

In other words, based on the mathematical formulae or equations shown below, when the angular speed of the bevel gear 210 driven by the second motor 220 is faster than the angular speed of the wheel body 20 rotated by the first motor 30, the sub-wheel units 100 are configured to have a negative speed in the second direction. As such, the sub-wheel units 100 are rotated in the negative direction of Vy. Additionally, when the angular speed of the bevel gear 210 is slower than the angular speed of the wheel body 20, the sub-wheel units 100 are configured to have a positive speed in the second direction. As such, the sub-wheel units 100 are configured to have a movement speed in the positive direction of Vy.

According to an embodiment of the present disclosure, in the case of movement speed in the first direction, calculation is performed based on the angular speed of the wheel body 20. Also, Vx is calculated as follows through a distance R from the central axis of the knuckle 10 to the end of the sub-wheels 110 and the angular speed W1 of the wheel body 20.

The first directional movement speed is calculated according to a mathematical formula or equation shown below:

$$Vx = R \times W1$$

In addition, the second directional speed of the sub-wheels 110 is calculated in consideration of the rotation amount of the drive shafts 230 based on the rotational angular speed of the wheel body 20. In other words, the second directional speed is calculated by multiplying a gear ratio N at the opposite ends of the drive shafts 230 (where n1 is a gear ratio of the bevel gear to the drive bevel gear and n2 is a gear ratio of the sub-wheel worm gear to the drive worm gear) and r (the radius of the sub-wheel 110) by a difference between the angular speed W1 of the wheel body 20 and the angular speed W2 of the bevel gear 210.

The second directional movement speed is calculated according to a mathematical formula or equation shown below:

$$Vy = n1 \times n2 \times r \times W1 - n1 \times n2 \times r \times W2$$

In other words, the second directional speed is calculated based on the difference between the angular speed of the wheel body 20 and the angular speed of the bevel gear 210 by the bevel gear 210 integrally rotated with the wheel body 20.

Here, when the difference between the angular speed of the wheel body 20 and the angular speed of the bevel gear 210 is 0 in the state in which an absolute value of the angular speed of the wheel body 20 is greater than 0, the drive device is moved in the first forward-and-rearward direction. In addition, when an absolute value of the angular speed of the bevel gear 210 is greater than 0 in the state in which the angular speed of the wheel body 20 is 0, the drive device is moved in the second forward-and-rearward direction.

Meanwhile, when the difference between the angular speed of the wheel body 20 and the angular speed of the bevel gear 210 is greater than 0 in the state in which the angular speed of the wheel body 20 is greater than 0, the drive device is moved in a direction having positive values of the first direction and the second direction. When the difference between the angular speed of the wheel body 20 and the angular speed of the bevel gear 210 is less than 0 in the state in which the angular speed of the wheel body 20 is greater than 0, the drive device is moved in a direction having a positive value in the first direction and a negative value in the second direction.

Furthermore, when the difference between the angular speed of the wheel body 20 and the angular speed of the bevel gear 210 is greater than 0 in the state in which the angular speed of the wheel body 20 is less than 0, the drive device is moved in a direction having a negative value in the first direction and a positive value in the second direction.

In other words, omnidirectional movement of the wheel in the first direction and/or the second direction is performable through control of the angular speed of the wheel body 20 and the angular speed of the bevel gear 210.

Additionally, when the difference between the angular speed of the wheel body 20 and the angular speed of the bevel gear 210 is less than 0 in the state in which the angular speed of the wheel body 20 is less than 0, the drive device is moved in a direction having a negative value in the first direction and a negative value in the second direction.

Here, the front in each of the first and second directions is expressed as a positive value, and the rear in each of the first and second directions is expressed as a negative value, but the direction is not limited thereto.

Figure 4A:
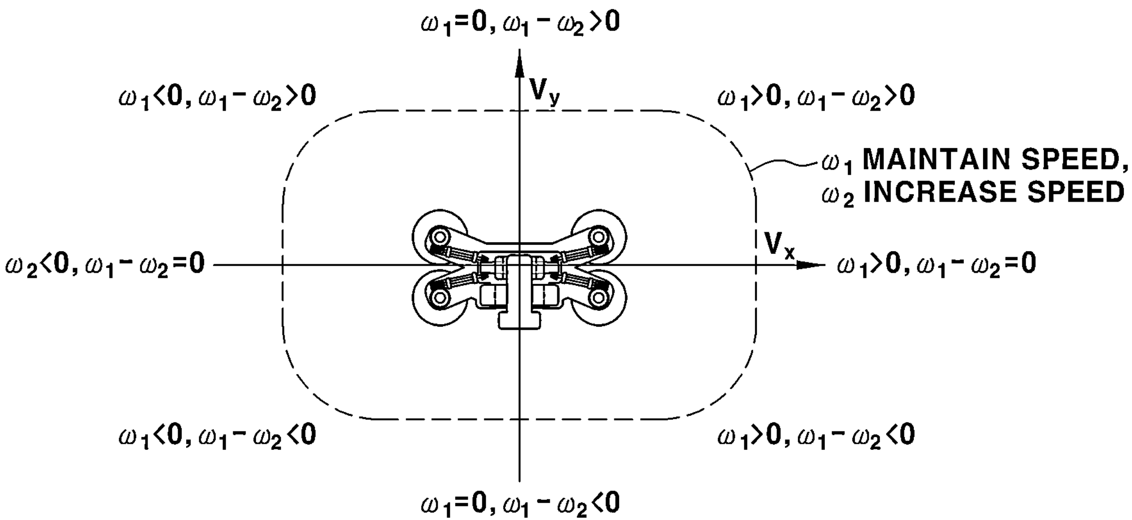
FIG. 4A is a diagram showing a movable area of the drive device when the maximum drive RPM of a second motor is higher than the maximum drive RPM of a first motor according to an embodiment of the present disclosure.
Figure 4B:
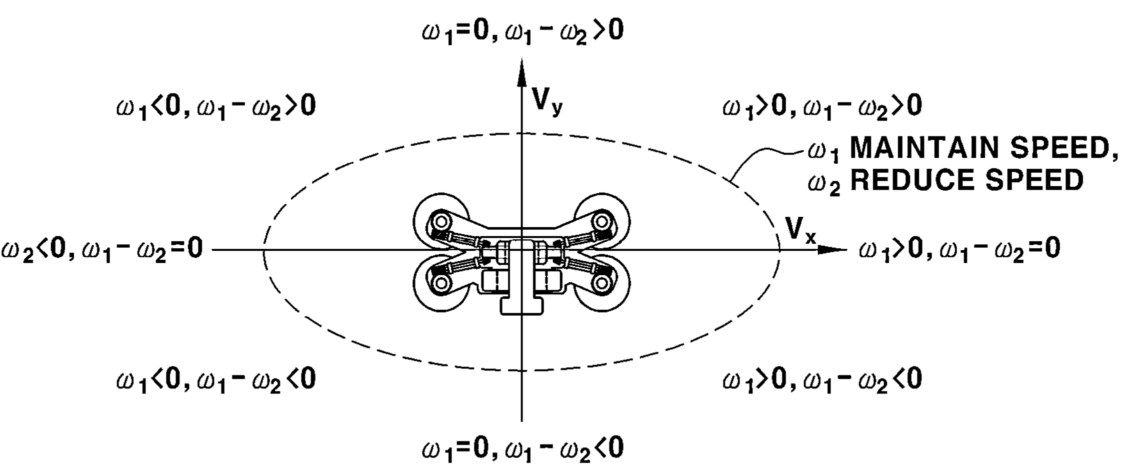
FIG. 4B is a diagram showing a movable area of the drive device when the maximum drive RPM of the first motor is the same as the maximum drive RPM of the second motor according to another embodiment of the present disclosure.

Further, as shown in FIGS. 4A and 4B, the drive radius of the rotation drive device may vary depending on the application of the first motor 30 and the second motor 220 of the present disclosure.

FIG. 4A shows an area in which the drive device is movable in the first direction and the second direction according to the embodiment of the present disclosure. As an example, the first motor 30 may be formed as a hollow type, an outer type, and a large diameter type, and the same is configured in a low RPM type and a high torque (in-wheel drive) type. In addition, the second motor 220 may be formed of a hollow and outer type motor so as to enable a brake to be mounted therein. Further, a motor capable of being driven at a relatively high RPM compared to the first motor 30 may be applied to the second motor 220.

In other words, W2 may be configured to have a relatively high RPM compared to W1, and the speed of W2 may be relatively large in the state in which the speed of Vx is constant. Therefore, as shown in FIG. 4A, in an embodiment of the present disclosure, the movement speed is configured so that the maximum speed in the first and second directions has a relatively wide area.

In comparison, FIG. 4B shows the movement direction of the drive device in a case where motors having the same drive RPM are respectively applied to the first motor 30 and the second motor 220.

As shown in FIG. 4B, W2 has the same maximum RPM as that of W1. Thus, the angular speed of W2 decreases and the speed of W1 is maintained. Accordingly, as shown in FIG. 4B, the movement speed is configured to have a relatively small area compared to FIG. 4A.

In other words, according to another embodiment of the present disclosure, when the first motor 30 and the second motor 220 are the same, control is performed such that the first motor 30 is decelerated in response to the diagonal movement of the drive device and the drive device is moved in the second direction.

As is apparent from the above description, the present disclosure may achieve the following effects by combining the embodiments with the above-described configuration, combination, and use relationship.

The present disclosure has an effect of providing an omnidirectional rotation drive device with a bevel gear coupled to the inside of a wheel body and a drive unit disposed so as to have a predetermined angle with the bevel gear and configured to apply drive force to sub-wheel units formed in two rows.

In addition, the present disclosure has an effect of freely and selectively setting the drive direction of a vehicle through the omnidirectional rotation drive device having an omni-wheel structure capable of being driven in the first direction and/or the second direction.

Furthermore, the present disclosure provides drive conditions for the sub-wheel units using the bevel gear, thereby having an effect of compactly designing the size of the drive device.

The technical concepts of the present disclosure have been described in detail with reference to various embodiments thereof. However, the present disclosure may be used in various other combinations, modifications, and environments. Thus, it should be appreciated by those having ordinary skill in the art that changes may be made in these embodiments without departing from the principles and spirit of the disclosure, the scope of which is defined in the appended claims and equivalents thereto. The embodiments describe examples to implement the technical idea of the present disclosure, and various changes required in specific application fields and uses of the present disclosure are also possible. Accordingly, the detailed description of the present disclosure is not intended to limit the present disclosure to the disclosed embodiments. Additionally, the scope of the appended claims should be construed as including other embodiments as well.

Reference numerals set forth in the drawings include reference to the following elements as further discussed above:

| | |
|---|---|
| 10: Knuckle | 20: Wheel body |
| 21: Central portion | 22: Bridge part |
| 23: Wheel drive shaft bearing | 30: First motor |
| 100: Sub-wheel unit | 110: Sub-wheel |
| 120: Sub-wheel worm gear | Drive unit: 210, 220, 230 |
| 210: Bevel gear | 220: Second motor |
| 230: Drive shaft | 231: Drive shaft bearing |
| 232: Drive worm gear | 233: Drive bevel gear |

What is claimed is:

1. An omnidirectional rotation drive device comprising:
a knuckle connected to a vehicle body;
a wheel body configured to rotate around the knuckle;
a plurality of sub-wheel units rotatably supported on the wheel body; and
a bevel gear located in the wheel body and configured to rotate with the knuckle as its central axis,
wherein the bevel gear has an annular shape to surround the knuckle, and
wherein the plurality of sub-wheel units is configured to rotate depending on a difference between an angular speed of the wheel body and an angular speed of the bevel gear.

2. The omnidirectional rotation drive device of claim 1, wherein a central axis of rotation of the plurality of sub-wheel units is perpendicular to a central axis of rotation of the wheel body.

3. The omnidirectional rotation drive device of claim 1, further comprising a plurality of drive shafts rotatably supported on the wheel body and configured to connect the bevel gear to the plurality of sub-wheel units.

4. The omnidirectional rotation drive device of claim 3, wherein each of the plurality of drive shafts has one end meshed with a corresponding one of opposite side surfaces of the bevel gear, and wherein each of the plurality of drive shafts has another end meshed with a corresponding one of the plurality of sub-wheel units formed in two rows on the opposite side surfaces of the bevel gear.

5. The omnidirectional rotation drive device of claim 3, wherein each of the plurality of drive shafts has one end formed of a drive bevel gear meshed with the bevel gear, and wherein each of the plurality of drive shafts has another end formed of a drive worm gear meshed with a sub-wheel worm gear of each of the plurality of sub-wheel units.

6. The omnidirectional rotation drive device of claim 5, wherein:
the wheel body is configured to rotate in a first direction;
the plurality of sub-wheel units is configured to rotate in a second direction;
a speed of the first direction is calculated by as $Vx=R\times W1$; and
a speed of the second direction is calculated as $Vy=n1\times n2\times r\times W1-n1\times n2\times r\times W2$,
wherein, W1 is an angular speed of the wheel body, R is a radius from a central axis of the wheel body to the sub-wheel unit, W2 is an angular speed of the bevel gear, n1 is a gear ratio of the bevel gear to the drive bevel gear, and n2 is a gear ratio of the sub-wheel worm gear to the drive worm gear.

7. The omnidirectional rotation drive device of claim 1, wherein the wheel body comprises:
a central portion surrounding the knuckle; and
a bridge part formed to extend outward from the central portion, wherein the bridge part has the sub-wheel units formed in two rows and located therein.

8. The omnidirectional rotation drive device of claim 1, further comprising:
a first motor configured to rotatably drive the wheel body; and
a second motor configured to rotatably drive the bevel gear.

9. The omnidirectional rotation drive device of claim 8, wherein:
only the wheel body is rotatably driven when the first motor and the second motor rotate at the same angular speed;
the wheel body and the plurality of sub-wheel units are simultaneously rotatably driven when the first motor rotates and the second motor stops; and
only the plurality of sub-wheel units are rotatably driven when the first motor stops and the second motor rotates.

10. An omnidirectional rotation drive device comprising:
a knuckle connected to a vehicle body;
a wheel body configured to rotate around the knuckle;
a plurality of sub-wheel units rotatably supported on the wheel body;
a bevel gear located in the wheel body and configured to rotate with the knuckle as its central axis; and
a plurality of drive shafts rotatably supported on the wheel body and configured to connect the bevel gear to the plurality of sub-wheel units,
wherein the plurality of drive shafts is arranged at an inclined angle relative to the central axis of the bevel gear, wherein the plurality of drive shafts is coupled to opposite side surfaces of the bevel gear to respectively drive the sub-wheel units arranged in two rows, and wherein the bevel gear has an annular shape to surround the knuckle.

11. The omnidirectional rotation drive device of claim 10, wherein a central axis of rotation of the plurality of sub-wheel units is perpendicular to a central axis of rotation of the wheel body.

12. The omnidirectional rotation drive device of claim 10, further comprising:

a first motor configured to rotatably drive the wheel body; and a second motor configured to rotatably drive the bevel gear.

13. The omnidirectional rotation drive device of claim 10, wherein each of the plurality of drive shafts has one end meshed with a corresponding one of opposite side surfaces of the bevel gear, and wherein each of the plurality of drive shafts has another end meshed with a corresponding one of the plurality of sub-wheel units formed in two rows on the opposite side surfaces of the bevel gear.

14. The omnidirectional rotation drive device of claim 10, wherein each of the plurality of drive shafts has one end formed of a drive bevel gear meshed with the bevel gear, and wherein each of the plurality of drive shafts has another end formed of a drive worm gear meshed with a sub-wheel worm gear of each of the plurality of sub-wheel units.

15. The omnidirectional rotation drive device of claim 14, wherein:

the wheel body rotates in a first direction;

each of the plurality of sub-wheel units rotates in a second direction;

a speed of the first direction is calculated as $Vx=R\times W1$; and a speed of the second direction is calculated as $Vy=n1\times n2\times r\times W1-n1\times n2\times r\times W2$, wherein W1 is an angular speed of the wheel body, R is a radius from a central axis of the wheel body to the sub-wheel unit, W2 is an angular speed of the bevel gear, n1 is a gear ratio of the bevel gear to the drive bevel gear, and n2 is a gear ratio of the sub-wheel worm gear to the drive worm gear.

16. The omnidirectional rotation drive device of claim 10, wherein the wheel body comprises:

a central portion surrounding the knuckle; and a bridge part formed to extend outward from the central portion, wherein the bridge part has the sub-wheel units formed in two rows and located therein.

17. The omnidirectional rotation drive device of claim 10, wherein the plurality of sub-wheel units is rotated depending on a difference between an angular speed of the wheel body and an angular speed of the bevel gear.

* * * * *